United States Patent
Tang et al.

(10) Patent No.: US 11,254,043 B2
(45) Date of Patent: Feb. 22, 2022

(54) HIGH-ACCURACY CONTACTLESS MEASUREMENT METHOD FOR MEASURING TEMPERATURE OF METAL THERMOFORMING MOLD

(71) Applicant: National Chung-Shan Institute of Science and Technology, Taoyuan (TW)

(72) Inventors: Shiang-Feng Tang, Taoyuan (TW); Shun-Lung Yen, Taoyuan (TW); Kun-Chi Lo, Taoyuan (TW); Wen-Jen Lin, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 729 days.

(21) Appl. No.: 16/231,592

(22) Filed: Dec. 23, 2018

(65) Prior Publication Data
US 2020/0198219 A1 Jun. 25, 2020

(51) Int. Cl.
| | |
|---|---|
| *G01J 5/00* | (2006.01) |
| *B29C 51/46* | (2006.01) |
| *G01K 13/00* | (2021.01) |
| *B29C 51/30* | (2006.01) |
| *B29C 51/18* | (2006.01) |
| *G01J 5/56* | (2006.01) |
| *G01J 5/06* | (2022.01) |
| *G01J 5/24* | (2006.01) |
| *G01J 5/52* | (2022.01) |
| *G01N 21/27* | (2006.01) |

(52) U.S. Cl.
CPC .............. *B29C 51/46* (2013.01); *B29C 51/18* (2013.01); *B29C 51/30* (2013.01); *G01J 5/06* (2013.01); *G01J 5/24* (2013.01); *G01J 5/522* (2013.01); *G01J 5/56* (2013.01); *G01K 13/00* (2013.01); *G01N 21/274* (2013.01); *G01J 2005/0048* (2013.01); *G01J 2005/0051* (2013.01); *G01J 2005/0077* (2013.01); *G01J 2005/068* (2013.01)

(58) Field of Classification Search
CPC ......... G01J 2005/068; G01J 2005/0077; G01J 2005/0051; G01J 2005/0048; G01J 5/522; G01J 5/24; G01J 5/06; G01J 5/00; G01N 21/274; G01K 13/00; B29C 51/30; B29C 51/46; B29C 51/18
USPC ......... 374/1, 141, 139, 121, 2, 133; 136/234
See application file for complete search history.

(56) References Cited

FOREIGN PATENT DOCUMENTS

CN 111718208 A * 9/2020

\* cited by examiner

*Primary Examiner* — Gail Kaplan Verbitsky
(74) *Attorney, Agent, or Firm* — Winston Hsu

(57) ABSTRACT

The present invention aims at providing a high-accuracy contactless measurement method for measuring the temperature of a metal thermoforming mold, which is capable of timely monitoring the metal temperature in multiple areas and also has threshold warning functionalities for delivering real-time notifications, in order to save the labor costs for long-term monitoring.

7 Claims, 1 Drawing Sheet

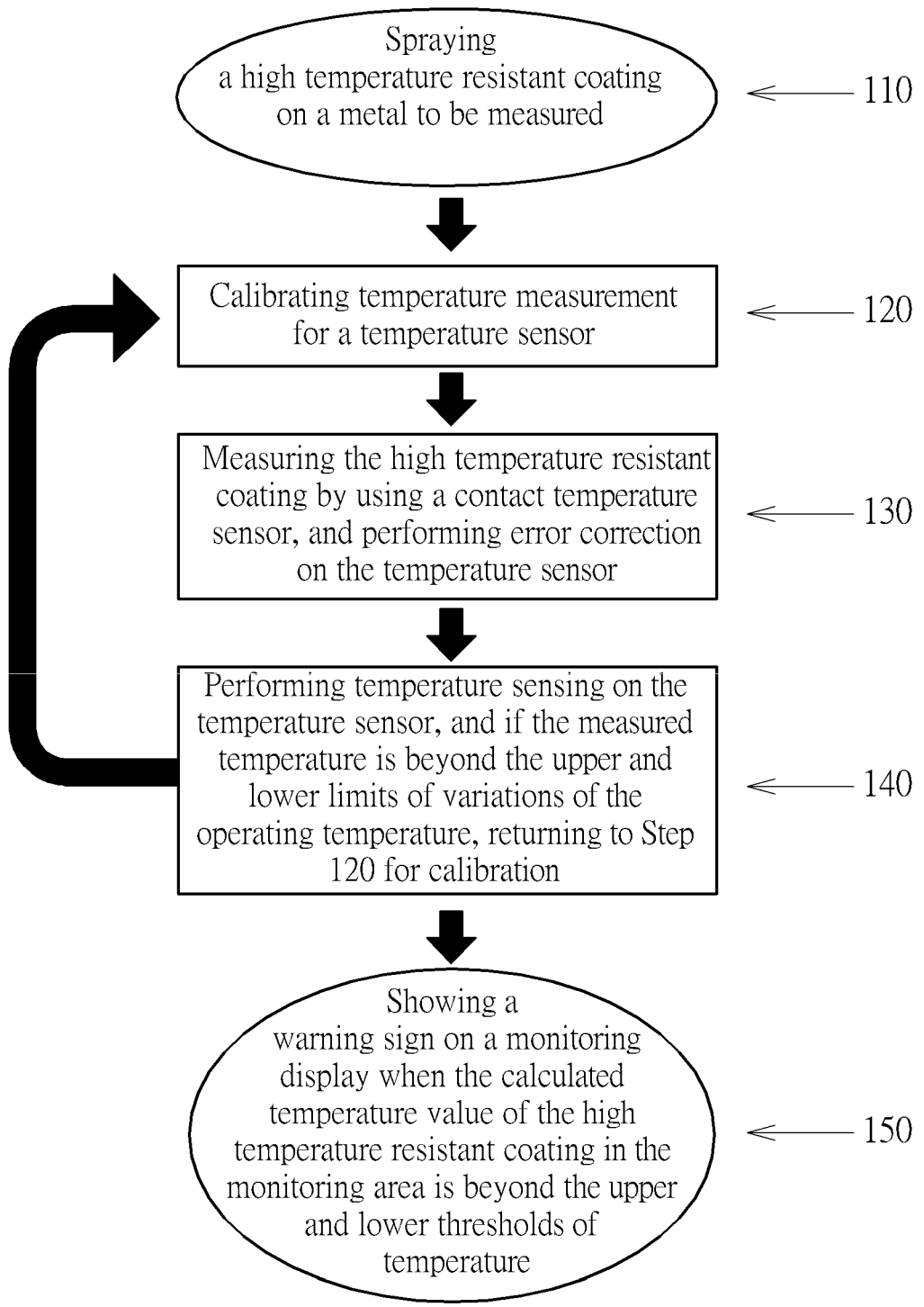

HIGH-ACCURACY CONTACTLESS MEASUREMENT METHOD FOR MEASURING TEMPERATURE OF METAL THERMOFORMING MOLD

BACKGROUND OF THE INVENTION

1. Field of the Invention

The present invention is related to a contactless measurement method for metal temperature, and more particularly, to a method of measuring the temperature of a metal thermoforming mold.

2. Description of the Prior Art

In the conventional thermoforming technology, the final forming size is affected by temperature control. However, with the feature of small specific heat of the metal thermoforming mold, thermal energies may dissipate causing falling temperature when the mold contacts the air, especially at the instant when the front-end and back-end thermal molds are separated. This situation is more severe in the colder winter.

In order to compensate the dissipation phenomenon, it is required to periodically monitor the temperature of the mold body. A conventional method applies a thermocouple probe. In this method, although the measurement error may achieve ±1° C. or even ±0.5° C., the obtained temperature information is only a temperature on a single point of the contact surface. If the operator needs to know the degree of temperature uniformity on the whole mold surface, the contact method may not be feasible.

The conventional thermal radiation measurement method performs measurement in an image manner, where each pixel is a temperature sensor. At present, the commercially available thermal imagers for measuring temperature are standalone machines. Although these thermal imagers are also capable of remote measurement and virtual color functions that can provide more intuitive determination of temperature measurement for the operator, they have identical problems as the thermocouple probe for the end user. This is because the analysis and calibration of values require calculations on a computer platform based on enough hardware resources, and the thermal imagers also provide temperature of a single point only. In addition, measurement of thermal radiation possesses difference on measured temperatures due to emissivity of different metal materials, environmental temperature, and different temperatures of measurement machines.

Thus, there is an urgent need for the industry to develop a high-accuracy contactless measurement method for measuring the temperature of a metal thermoforming mold, which is capable of timely monitoring the metal temperature in multiple areas and also equipped with threshold warning functionalities for delivering real-time notifications, in order to save the labor costs for long-term monitoring.

SUMMARY OF THE INVENTION

In view of the abovementioned drawbacks of the prior art, the present invention aims at providing a high-accuracy contactless measurement method for measuring the temperature of a metal thermoforming mold. The temperature sensor is calibrated by using thermal radiation calibration regression coefficients, and a high temperature resistant coating is sprayed on the metal thermoforming mold. Therefore, the temperature measurement method will not be influenced by the environmental temperature and the radiation rate and roughness of the surface of different metal objects. This significantly enhances the accuracy and precision of temperature on the measured area, and the metal temperature may be monitored at multiple areas immediately. Also, the temperature measurement method has the threshold warning functionalities capable of delivering real-time notifications, in order to save the labor costs for long-term monitoring.

In order to achieve the above purposes, the present invention provides a high-accuracy contactless measurement method for measuring the temperature of a metal thermoforming mold, and the method comprises steps of:

(A): spraying a high temperature resistant coating on a metal to be measured, wherein the high temperature resistant coating is in a visible band of an infrared band, for determining a monitoring area on the high temperature resistant coating;

(B): providing a temperature sensor, measuring a focal plane array (FPA) of the temperature sensor, obtaining an FPA operating temperature, determining a thermal radiation calibration regression coefficient based on the FPA operating temperature, and calibrating the temperature measured by the temperature sensor based on the thermal radiation calibration regression coefficient;

(C): providing a contact temperature sensor, measuring the high temperature resistant coating to obtain a contact temperature value by using the contact temperature sensor, measuring the high temperature resistant coating to obtain a contactless temperature value by using the temperature sensor, and calculating the contactless temperature value to compensate an error of the contactless temperature value with the contact temperature value so as to obtain a calculated temperature value by taking the contact temperature value as a basic value;

(D): setting a group of upper and lower limits of variations of the FPA operating temperature based on the FPA operating temperature, measuring the FPA to obtain a real-time FPA operating temperature and comparing the real-time FPA operating temperature with the FPA operating temperature obtained in Step (B), and returning to perform Step (B) to Step (D) when the real-time FPA operating temperature is greater than the upper limit of variations of the FPA operating temperature or smaller than the lower limit of variations of the FPA operating temperature;

(E): setting a group of upper and lower thresholds of temperature, analyzing the calculated temperature value of the high temperature resistant coating in the monitoring area, and showing a warning sign on a monitoring display when an average value of the calculated temperature values of all of the analyzable high temperature resistant coatings is greater than the upper threshold of temperature or smaller than the lower threshold of temperature.

In the high-accuracy contactless measurement method for measuring the temperature of a metal thermoforming mold according to the present invention, Step (B) further comprises: measuring the temperature sensor and its environment to obtain a shell temperature and an environmental background temperature, and determining a plurality of thermal radiation calibration regression coefficients according to the environmental background temperature, the shell temperature and the FPA operating temperature.

In the high-accuracy contactless measurement method for measuring the temperature of a metal thermoforming mold according to the present invention, the step of determining a plurality of thermal radiation calibration regression coefficients according to the environmental background temperature, the shell temperature and the FPA operating temperature comprises: looking up a calibration regression coefficient table to read the plurality of thermal radiation calibration regression coefficients corresponding to the environmental background temperature, the shell temperature and the FPA operating temperature; wherein the calibration regression coefficient table is related to a calculation result obtained when electronic signals generated by the temperature sensor measuring objects having different temperatures and at least one thermal radiation calibration regression coefficient among the plurality of thermal radiation calibration regression coefficients are fixed values.

In the high-accuracy contactless measurement method for measuring the temperature of a metal thermoforming mold according to the present invention, the materials of the high temperature resistant coating comprise a pigment, a resin and an organic solvent.

In the high-accuracy contactless measurement method for measuring the temperature of a metal thermoforming mold according to the present invention, the difference between the calculated temperature value of the high temperature resistant coating and a real temperature value of the high temperature resistant coating is smaller than 1 degree Celsius.

In the high-accuracy contactless measurement method for measuring the temperature of a metal thermoforming mold according to the present invention, the temperature sensor is a sensor device based on a micrometric thermal radiation sensor.

In the high-accuracy contactless measurement method for measuring the temperature of a metal thermoforming mold according to the present invention, the infrared band is a wavelength of 8-14 nm.

These and other objectives of the present invention will no doubt become obvious to those of ordinary skill in the art after reading the following detailed description of the preferred embodiment that is illustrated in the various FIGURES and drawings.

BRIEF DESCRIPTION OF THE DRAWINGS

The FIGURE is a schematic diagram of a process of a high-accuracy contactless measurement method for measuring the temperature of a metal thermoforming mold.

DETAILED DESCRIPTION

The implementations of the present invention are illustrated with specific embodiments hereinafter. Those skilled in the art may easily understand the advantages and efficacies of the invention from the present disclosure.

Please refer to the FIGURE, where the present invention provides a high-accuracy contactless measurement method for measuring the temperature of a metal thermoforming mold, and the method comprises:

Step (A) 110: spraying a high temperature resistant coating on a metal to be measured, wherein the high temperature resistant coating is in a visible band of an infrared band, for determining a monitoring area on the high temperature resistant coating;

Step (B) 120: providing a temperature sensor, measuring a focal plane array (FPA) of the temperature sensor, obtaining an FPA operating temperature, determining a thermal radiation calibration regression coefficient based on the FPA operating temperature, and further looking up a model table of the thermal radiation calibration regression coefficient built in the system to promptly determine the thermal radiation calibration regression coefficient, to calibrate the temperature measured by the temperature sensor based on the thermal radiation calibration regression coefficient;

Step (C) 130: providing a contact temperature sensor, measuring the high temperature resistant coating to obtain a contact temperature value by using the contact temperature sensor, measuring the high temperature resistant coating to obtain a contactless temperature value by using the temperature sensor, and calculating the contactless temperature value to compensate an error of the contactless temperature value with the contact temperature value so as to obtain a calculated temperature value by taking the contact temperature value as a basic value;

Step (D) 140: setting a group of upper and lower limits of variations of the FPA operating temperature based on the FPA operating temperature, measuring the FPA to obtain a real-time FPA operating temperature and comparing the real-time FPA operating temperature with the FPA operating temperature obtained in Step (B), and returning to perform Step (B) to Step (D) when the real-time FPA operating temperature is greater than the upper limit of variations of the FPA operating temperature or smaller than the lower limit of variations of the FPA operating temperature, in order to prevent the accuracy of measurement from being reduced due to excessively large temperature variations of the temperature sensor in thermal radiation calibration of the temperature sensor;

Step (E) 150: setting a group of upper and lower thresholds of temperature, analyzing the calculated temperature value of the high temperature resistant coating in the monitoring area, and showing a warning sign on a monitoring display when an average value of the calculated temperature values of all of the analyzable high temperature resistant coatings is greater than the upper threshold of temperature or smaller than the lower threshold of temperature.

In the high-accuracy contactless measurement method for measuring the temperature of a metal thermoforming mold according to the present invention, Step (B) further comprises: measuring the temperature sensor and its environment to obtain a shell temperature and an environmental background temperature, and determining a plurality of thermal radiation calibration regression coefficients according to the environmental background temperature, the shell temperature and the FPA operating temperature. The step of determining a plurality of thermal radiation calibration regression coefficients according to the environmental background temperature, the shell temperature and the FPA operating temperature comprises: looking up a calibration regression coefficient table to read the plurality of thermal radiation calibration regression coefficients corresponding to the environmental background temperature, the shell temperature and the FPA operating temperature; wherein a calibration regression coefficient table may be established in an information processing system in advance, so as to immediately calculate the real temperature value of the measured object or the high temperature resistant coating, and the calibration regression coefficient table is related to a calculation result obtained when electronic signals generated by the temperature sensor measuring objects having different temperatures and at least one thermal radiation calibration regression coefficient among the plurality of thermal radiation calibration regression coefficients are fixed values.

The thermal radiation calibration regression coefficient used in the present invention may be applicable to a temperature sensor device based on a micrometric thermal radiation sensor or a thermal imager. The temperature sensor has a shell and a focal plane array (FPA). The measurement results of the environmental background temperature, the shell temperature and the FPA operating temperature are substituted into the following formula:

$$T_O = \frac{B}{\ln\left(\frac{R}{V_D - O} + F\right)};$$

wherein $V_D$ is the measurement voltage value measured by the temperature sensor, R, B, F, and O are thermal radiation calibration regression coefficients, e.g., the thermal radiation calibration regression coefficient R refers to the system response of the temperature sensor receiving external energies, the thermal radiation calibration regression coefficient B refers to an absorption spectrum parameter of the temperature sensor, the thermal radiation calibration regression coefficient F refers to a nonlinear calibration parameter of the temperature sensor, and the thermal radiation calibration regression coefficient O refers to a deviation parameter, and $T_O$ is the real temperature value of the measured object. Calculation is performed by substituting the measurement voltage value $V_D$ measured by the temperature sensor and the thermal radiation calibration regression coefficients into this formula, to solve and obtain the real temperature value $T_O$ of the measured object.

The present invention provides an implementation of spraying high temperature resistant coating on the metal thermoforming mold, to apply the infrared thermal images to perform large-area temperature monitoring on the metal thermoforming mold. This overcomes the problems of intrinsic difference between the radiation temperature and real temperature due to low thermal emissivity on the metal surface, wherein the materials of the high temperature resistant coating may be selected from combination of a pigment, a resin, and/or an organic solvent. The wavelength of infrared ray may range between 8-14 nm.

In an embodiment of the present invention, the infrared thermal image temperature sensing system is turned on first for 30 minutes, allowing the system to become stable. The temperature sensor disposed at the back of the FPA inside the thermal imager is applied to obtain its operating temperature, to determine the thermal radiation calibration regression coefficients (R, B, F, and O). Based on the upper and lower limits of variations of the FPA temperature setting, a built-in model table of the thermal radiation calibration regression coefficients may be looked up automatically, to obtain the thermal radiation calibration regression coefficients corresponding to the current operating temperature of the FPA inside the thermal imager. The high temperature resistant coating visible in the infrared thermal image is sprayed on the surface of the measured metal, and the measurement value of a contact-type thermometer is taken as the compensation basis for temperature monitoring. The monitored temperature is compensated by its error with the basic value via calculation. In addition, the upper and lower thresholds for the monitoring area are set. A green symbol is shown if within the thresholds, and a red symbol is shown for warning if the temperature of the monitoring area is beyond the set upper limit or lower limit. The thermal radiation calibration regression coefficients are utilized to inversely calculate the temperature value, and all analyzable temperature point values in an arbitrarily set monitoring area are presented by their average value. Finally, when leaving the system, the temperature data in all of the selected monitoring areas may be surveyed and analyzed.

By using the above method, an embodiment of the present invention is: when the environmental background temperature is 18.8° C., the temperature inside the shell of the thermal imager is 23.76° C. and the operating temperature of the inside FPA is 22.4° C., performing calibration on two temperature points (30° C. and 90° C.) by substituting into the formula:

$$T_O = \frac{B}{\ln\left(\frac{R}{V_D - O} + F\right)}.$$

Meanwhile, the coefficients B and F are set to fixed values, to be B=1428 and F=1, respectively, to solve this linear equation in two unknowns and obtain R=338281 and O=729.066. The measurement results are summarized in the following table:

| Standard temperature | Average voltage value $V_D$ (counts) | Temperature value after inverse calculation | |
|---|---|---|---|
| 25° C. | 3550 | 24.8° C. | |
| 50° C. | 4873.5 | 50.49° C. | |
| 75° C. | 6414.25 | 75.07° C. | |
| 100° C. | 8311.25 | 100.798° C. | |
| Thermal radiation calibration regression coefficients | R 338281 | O 729.066 | B 1428 | F 1 |

As can be seen in the table, the difference between the calculated temperature value and the real temperature value is smaller than 1 degree Celsius.

By using the above method, another embodiment of the present invention is: applying two flat-type standard black body radiation source as the basis of high (180° C.) and low (50° C.) temperatures for calibration, and monitoring the metal surface in high temperature. Meanwhile, two high temperature resistant coatings 1 and 2 are sprayed and a graphite slice and a contact-type thermocouple thermometer are glued on the metal surface, respectively. With calibration on the two temperature points (50° C. and 180° C.), the thermal radiation calibration regression coefficients (R: 332339.8, B: 1428, F: 1, O: 745.7) are determined under the temperature condition, which are inversely calculated to obtain the temperature information of the object. Also, the monitoring area is selected, and after 2-minute monitoring, the measurement result is shown in the following table:

|  | Black body temperature 180° C. R0 | Thermocouple thermometer | Coating1 R1 | Coating2 R2 | Graphite R3 | Metal R4 |
|---|---|---|---|---|---|---|
| Measurement result of thermal image temperature R0~R4 | 180.17° C. | 160.9° C. | 160.57° C. | 149.67° C. | 138.15° C. | 45.9° C. |
| Difference with the thermocouple thermometer value |  |  | 0.33 | 11.23 | 22.75 | 115 |

The difference value of monitoring the high temperature black body is only 0.17° C., the average temperature obtained by directly reading the metal surface area R4 is 45.9° C., and its difference with the thermocouple thermometer value reaches 115° C. Taking the difference value as the temperature compensation value, the measured temperature value of metal in any unknown temperature may be compensated by increasing or decreasing linearly. Although the thermocouple thermometer can only measure the single point temperature, the temperature compensation value obtained via calculation may calibrate multi point temperatures of thermal image measurement. In addition, the difference between further usage of the coating 1 and the thermocouple thermometer value is 0.33° C., which effectively solves the calculation difference of temperature caused by the emissivity problem on the metal surface.

In order to monitor the temperature of the metal thermoforming mold, the present invention provides a contactless, multi-point monitoring and high-accuracy method for measuring the metal temperature, which effectively solves the abovementioned problems in the prior art, enhances the accuracy of thermoforming technology, and reduces the labor required for monitoring.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high-accuracy contactless measurement method for measuring a temperature of a metal thermoforming mold, the method comprising steps of:
   (A): spraying a high temperature resistant coating on a metal to be measured, wherein the high temperature resistant coating is in a visible band of an infrared band, for determining a monitoring area on the high temperature resistant coating;
   (B): providing a temperature sensor, measuring a focal plane array (FPA) of the temperature sensor, obtaining an FPA operating temperature, determining a thermal radiation calibration regression coefficient based on the FPA operating temperature, and calibrating the temperature measured by the temperature sensor based on the thermal radiation calibration regression coefficient;
   (C): providing a contact temperature sensor, measuring the high temperature resistant coating to obtain a contact temperature value by using the contact temperature sensor, measuring the high temperature resistant coating to obtain a contactless temperature value by using the temperature sensor, and calculating the contactless temperature value to compensate an error of the contactless temperature value with the contact temperature value so as to obtain a calculated temperature value by taking the contact temperature value as a basic value;
   (D): setting a group of upper and lower limits of variations of the FPA operating temperature based on the FPA operating temperature, measuring the FPA to obtain a real-time FPA operating temperature and comparing the real-time FPA operating temperature with the FPA operating temperature obtained in Step (B), and returning to perform Step (B) to Step (D) when the real-time FPA operating temperature is greater than the upper limit of variations of the FPA operating temperature or smaller than the lower limit of variations of the FPA operating temperature;
   (E): setting a group of upper and lower thresholds of temperature, analyzing the calculated temperature value of the high temperature resistant coating in the monitoring area, and showing a warning sign on a monitoring display when an average value of the calculated temperature values of all of the analyzable high temperature resistant coatings is greater than the upper threshold of temperature or smaller than the lower threshold of temperature.

2. The high-accuracy contactless measurement method for measuring a temperature of a metal thermoforming mold of claim 1, wherein Step (B) further comprises:
   measuring the temperature sensor and an environment to obtain a shell temperature and an environmental background temperature, and determining a plurality of thermal radiation calibration regression coefficients according to the environmental background temperature, the shell temperature and the FPA operating temperature.

3. The high-accuracy contactless measurement method for measuring a temperature of a metal thermoforming mold of claim 2, wherein the step of determining a plurality of thermal radiation calibration regression coefficients according to the environmental background temperature, the shell temperature and the FPA operating temperature comprises:
   looking up a calibration regression coefficient table to read the plurality of thermal radiation calibration regression coefficients corresponding to the environmental background temperature, the shell temperature and the FPA operating temperature;
   wherein the calibration regression coefficient table is related to a calculation result obtained when electronic signals generated by the temperature sensor measuring objects having different temperatures and at least one thermal radiation calibration regression coefficient among the plurality of thermal radiation calibration regression coefficients are fixed values.

4. The high-accuracy contactless measurement method for measuring a temperature of a metal thermoforming mold of claim 1, wherein materials of the high temperature resistant coating comprise a pigment, a resin and an organic solvent.

5. The high-accuracy contactless measurement method for measuring a temperature of a metal thermoforming mold of claim 1, wherein a difference between the calculated temperature value of the high temperature resistant coating and a real temperature value of the high temperature resistant coating is smaller than 1 degree Celsius.

6. The high-accuracy contactless measurement method for measuring a temperature of a metal thermoforming mold of claim 1, wherein the infrared band is a wavelength of 8-14 nm.

7. The high-accuracy contactless measurement method for measuring a temperature of a metal thermoforming mold of claim 1, wherein the temperature sensor is a sensor device based on a micrometric thermal radiation sensor.

\* \* \* \* \*